UNITED STATES PATENT OFFICE.

MEINHARD HOFFMANN, OF MAINKUR, NEAR FRANKFORT-ON-THE-MAIN, ASSIGNOR TO LEOPOLD CASSELLA & CO., OF FRANKFORT-ON-THE-MAIN, GERMANY.

MANUFACTURE OF BETA-NAPHTHOL SULPHONIC ACID.

SPECIFICATION forming part of Letters Patent No. 331,059, dated November 24, 1885.

Application filed February 7, 1884. Serial No. 120,040. (No specimens.)

*To all whom it may concern:*

Be it known that I, MEINHARD HOFFMANN, a subject of the Emperor of Germany, and residing at Mainkur, near Frankfort-on-the-Main, Germany, have invented new and useful improvements in the manufacture of a new color-producing acid, consisting, essentially, in the preparation and utilization of a new disulphonic acid of beta-naphthol, of which the following is a specification.

My invention relates to a new disulpho-acid of beta-naphthol. It is well known that by treating beta-naphthol with commercial sulphuric acid at the temperature of 100° centigrade, or below, two monosulphuric acids of beta-naphthol are obtained, the one described by Schaeffer (Ann. Chem. 152,381) and the other, called by its inventor (Patent No. 256,381) "alpha-monosulphonic acid of beta-naphthol," corresponding with the difficultly soluble monosulphonic acid of beta-naphthylamine. I have found that this alpha-monosulphonic acid can be transformed into a new disulphonic acid of beta-naphthol, which I call "gamma-disulphonic acid of beta-naphthol."

In order to get the new acid out of the alpha-monosulphonic acid or their salts, I proceed as follows: Fifty kilograms of finely-powdered potassium salt of the beta-naphthol-monosulphonic acid are mixed with one hundred and fifty kilograms commercial sulphuric acid, and heated to 40° to 50° centigrade during five to six hours. After that time the new acid is formed, and a sample of the mixture gives with ammonia a solution showing a pure blue fluorescence. This point being reached, the mass is converted in the usual way into the potassium salt of the gamma-disulphonic acid of beta-naphthol. The exact time during which the sulphuric acid is acting upon the alpha-monosulphonic acid and other details may be varied, for I get the identical result by heating, for example, the mixture one to two hours at 100° centigrade, or leaving it standing eight to ten days at a temperature of 25° centigrade. Other means well known to chemists as sulphonating agents may also be made to answer the purpose. I also succeed in starting direct from the beta-naphthol.

In order to characterize the conditions under which favorable yields of gamma-disulphonic acid of beta-naphthol are obtained, I give the following examples:

*Example 1.*—Naphthol is first converted into naphthylsulphonic acid, which is then treated cautiously at the beginning of the operation, to prevent the temperature from rising, with sulphonating agents; or, one part of finely-powdered beta-naphthol is mixed with five parts of sulphuric acid, (66° Baumé,) cooled down to 0° centigrade. The temperature of the mixture is then gradually increased to 60° centigrade within thirty-six hours. Principally gamma-disulphonic acid of beta-naphthol is formed, which separates itself in the smelt.

*Example 2.*—Beta-naphthol is first converted according to known methods into the mixture of the monosulphonic acids, which are then treated with sulphonating agents under conditions which avoid the formation of the known disulphonic acids of beta-naphthol. One part of beta-naphthol is treated with two parts of sulphuric acid of 66° Baumé at 40° to 60° centigrade until solution sets it; then, further, two parts of sulphuric acid of 66° Baumé are added, and the whole is kept at this temperature until the smelt becomes thick, or it is left standing from eight to ten days at 20° centigrade.

These examples show that this reaction requires a certain correspondence between the quantity or strength of sulphuric acid, the temperature, and the duration of the operation. The same result may be obtained by an increase of strength or quantity of the sulphuric acid and by diminution of temperature, or by a higher temperature and a shorter time of reaction. A suitable variation of these conditions allows the replacement of sulphuric acid of 66° Baumé by any other known sulphonating agent. The sulphonation can be regarded as finished as soon as alpha-monosulphonic acid cannot be detected any longer.

The separation of the sulphonic acids of beta-naphthol formed in the reaction above described can be effected by crystallization of their salts. Principally, the salts of barium, sodium, and potassium are well fitted for this purpose, experience having taught that these salts of the sulphuric acids formed at the same time with the gamma-disulphonic acid crystallize first.

In many cases, especially when the gamma-disulphonic acid is to be employed for the production of azo colors, it is advantageous to effect the separation by fractional precipitation with diazo compounds. For this purpose I first determine by titration with diazo-naphthaline the quantity of sulphuric acids which forms, immediately, colored precipitates with the named agent, gamma-disulphonic acid not having this quality. This titration is executed by adding a solution of known standard of diazo-naphthaline cooled with ice to the cooled alkaline solution of the naphtholsulphonic acids as long as dye-stuff is formed. One part of the thus-used naphthylamine corresponds with one part of naphthol. In conformity with the result of this titration the accompanying naphtholsulphonic acids are then precipitated by an equivalent quantity of diazo compounds of benzole, toluol, xylol, or their sulphonic acid compounds or of other diazo compounds. After filtration the liquor contains the pure salt of the gamma-disulphonic acid.

A third method of obtaining the new disulphonic acid of beta-naphthol I found by decomposing the corresponding diazo-beta-naphthylamine disulphonic acid by acidulated boiling water. The salts of the gamma-disulphonic acid in general crystallize easily. The potassium salt is soluble in two and one-half parts of boiling water, and is obtained from this solution in large shining crystals. The pure blue fluorescence of an alkaline solution of the new acid is most characteristic of it in opposition to the green fluorescence of the sulphuric acids of the Simpach Patent, No. 268,506, and the Endemann Patent, No. 277,864. This quality, as well as the shades of the different azo colors formed with it, and principally the above-mentioned particularity of not forming immediately azo colors with the diazo compounds of naphthaline, xylidine, &c., distinguish my new disulphonic acid of beta-naphthol from the esomers discovered by Baum, Patent No. 210,233.

By combination of the gamma-disulphonic acid with aromatic diazo compounds new and valuable coloring-matters are formed, some of which form the subjects of separate applications for Letters Patent. A great number of shades are obtained by altering the nature of the combined diazo compounds. Thus I obtain colors from yellow to red, claret, and brown by the use of aniline, toluidine, xylidine, cumidine, alpha and beta naphthylamine, methylnaphthylamine, benzidine, amidoazo-benzole, amidoazo-toluol, amidoazo-xylol, the mixed amidoazo compounds, the amidophenols, the methyl and ethyl ethers thereof, (and of the sulphuric acids of the named bases,) as well as from the diazo compounds of the nitranilines, nitro-toluidines, and the nitro-amidophenoles. The orange color formed by the reaction of the gamma-disulphonic acid upon diazo-benzole has an eminent tendency to crystallize, and is therefore very fit to identify the new acid.

Having thus described my invention, I claim as new and desire to secure by Letters Patent—

1. The method of producing the gamma-disulphonic acid of beta-naphthol, which consists in first sulphonating the alpha-monosulphonic acid of beta-naphthol or beta-naphthol itself, and finally purifying the acid, substantially as described.

2. As a new article of manufacture, the herein-described gamma-disulphonic acid of beta-naphthol.

In testimony whereof I have signed my name to this specification in the presence of two subscribing witnesses.

MEINHARD HOFFMANN.

Witnesses:
 FRANZ WIRTH,
 FRANZ HASSLACHER.